Nov. 15, 1960    H. D. TAYLOR    2,960,360
RETAINING RING STRUCTURE FOR DYNAMOELECTRIC MACHINE
Filed Dec. 29, 1958
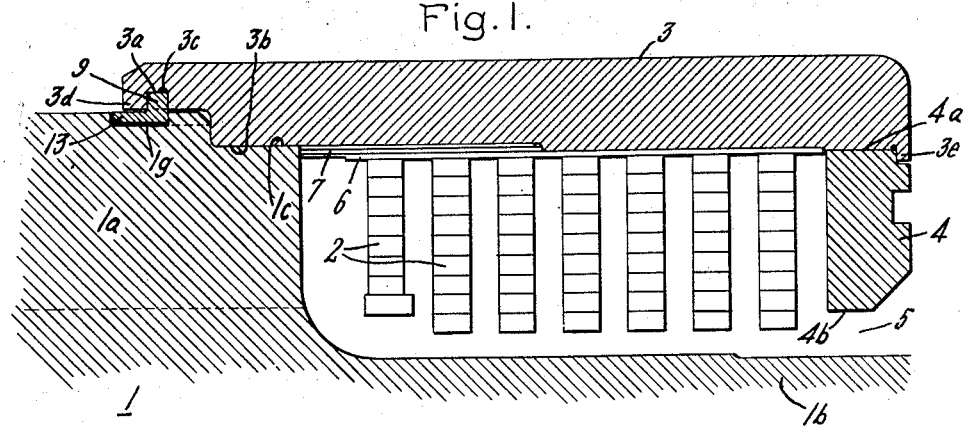
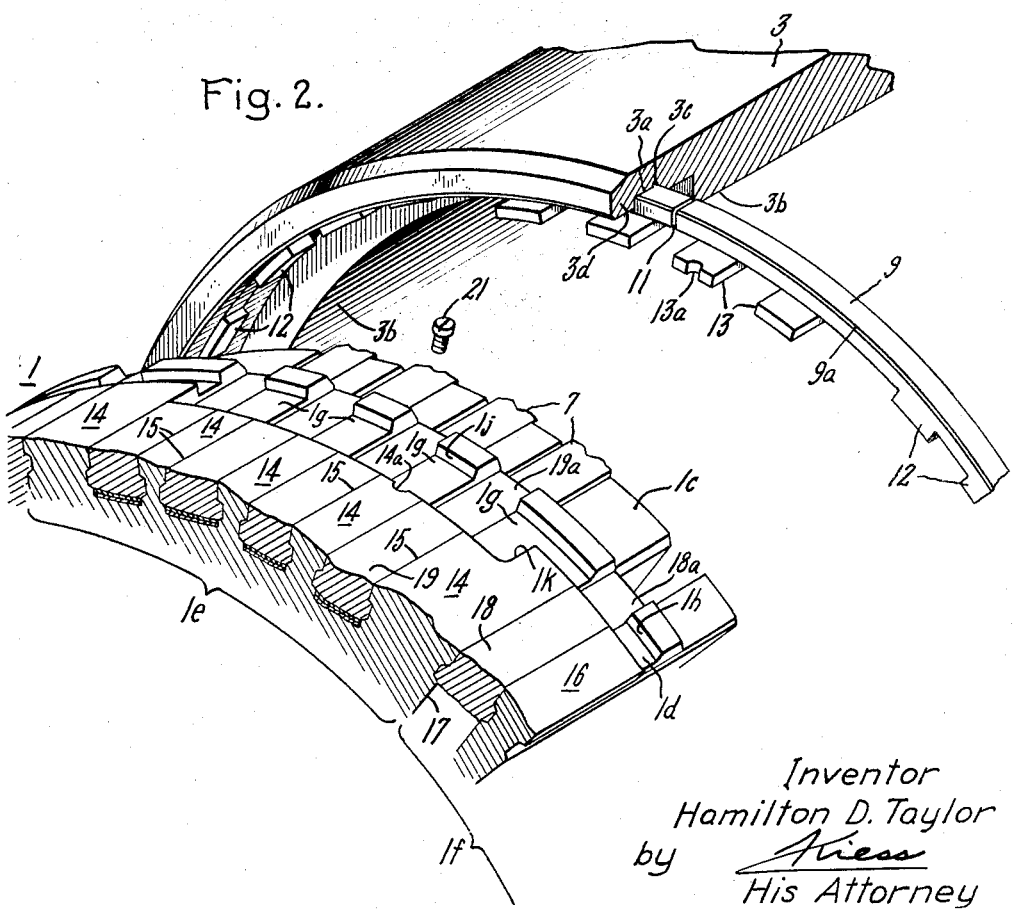
Inventor
Hamilton D. Taylor
by *Kiess*
His Attorney ial Nov. 15, 1960

2,960,360

RETAINING RING STRUCTURE FOR DYNAMO-ELECTRIC MACHINE

Hamilton D. Taylor, Schenectady, N.Y., assignor to General Electric Company, a corporation of New York Filed Dec. 29, 1958, Ser. No. 783,503

6 Claims. (Cl. 287—103)

This invention relates to dynamoelectric machines and more particularly to an improved locking structure for securing the retaining rings on the rotor.

A typical rotor used, for example, in a large steam turbine driven alternator consists primarily of a solid steel cylindrical member. The central body portion is provided with axial slots to hold the field windings, and, at each end, spindle portions of reduced diameter support the rotor in the bearings and provide clearance spaces for the end portions of the field coils, or "end turns." Since the coils are subjected to centrifugal forces which tend to throw them from the rotor, a "retaining ring" is usually employed at each end to hold the end turns in place. A retaining ring is a cylindrical member encasing the end turns and secured firmly to the rotor. Such a retaining ring may be fixed to the shaft either by shrinking the retaining ring to a "centering ring" on the end spindle, or to the rotor body itself, or by a combination of these two methods.

At high speeds, centrifugal force causes the end turns to press tightly against the inside of the retaining ring, and subsequent thermal expansion causes the end turns to exert large axial forces on the retaining ring, which tend to move it with respect to the rotor. Therefore, some additional securing means is necessary to prevent axial movement of the retaining ring with respect to the rotor.

Retaining rings are usually the most highly stressed members in the whole rotor assembly, partly due to hoop stresses caused by the centrifugal forces from the weight of the ring material itself, and partly by the additional load from supporting the end portions of the field winding. In addition, local stresses are caused by the shrinkage forces, which must be greater than the centrifugal forces in order to maintain a tight fit at normal speed and overspeed up to turbine trip-out speed. Consequently, it is important to avoid any holes, notches, and particularly axial slots in the retaining ring which would act as points of stress concentration, which might possibly lead to rupture of the retaining ring. One such method of securing a retaining ring against axial movement, by keying it to a centering ring, is disclosed in U.S. Patent 2,773,210, issued December 4, 1956 to G. H. Vogt, and assigned to the same assignee as the present invention.

Accordingly, one object of the present invention is to provide an improved locking structure for a retaining ring shrunk on the rotor body, which secures the retaining ring against axial movement, without the necessity of holes, notches, or axial slots in the retaining ring.

Another object is to provide an improved locking key which is used to limit axial displacement of a highly stressed cylindrical member from a coaxially disposed member.

A still further object is to provide an improved generator retaining ring construction consisting of few parts, which is easy to assemble and to take apart.

Other objects and advantages will become apparent from the following description taken in connection with the accompanying drawings, in which:

Fig. 1 is a partial section of a rotor end showing the transition between the body and spindle portions of the rotor, the end windings, and the retaining ring.

Fig. 2 is a perspective view, partly in section, showing the details of the locking assembly.

Generally stated, the invention is practiced by providing an annular key which locks the retaining ring against axial movement on the rotor. The key is provided with projecting lugs which, when the key is in one position, allow the retaining ring to slide axially onto the rotor body. Upon moving the key circumferentially into another position after the retaining ring is in place, the lugs limit axial displacement.

Referring now to Fig. 1, a portion of the rotor, shown generally at 1, consists of a rotor body 1a and a rotor spindle 1b. Seen in cross-section are the circumferential parts of the end turns 2, which are held in place against centrifugal force by the retaining ring 3. The retaining ring 3 is shrunk to rotor body 1a at circumferential surface 1c and, at the other end is shrunk onto a fairly massive centering ring 4 at circumferential surface 4a. It will be noted that there is a generous radial clearance space 5 between the spindle 1b and the inner periphery 4b of the centering ring 4. This allows the spindle to flex slightly with respect to the rotor body, without disturbing the alignment of the retaining ring which is fixed by the shrink fit on the body. The end turns 2 are insulated from the retaining ring by insulation 6. An amortisseur winding is used to protect the shrink fit surface at the body end of the retaining ring against possible burning from heavy transient currents. The function of the amortisseur winding 7 will not be described further since it is not necessary to an understanding of the present invention.

In addition to being secured to the rotor 1 by a shrink fit at 1c, retaining ring 3 is prevented from moving axially with respect to rotor 1 by a special locking key 9 which is disposed in annular groove 3a and recesses 1d, 1g of the retaining ring and rotor respectively. Reference now to Fig. 2 will show in more detail the structure of locking key 9.

Locking key 9 is an annular member, generally of rectangular cross-section, which has been cut through at one point 11 in its circumference to provide an opening to allow for its insertion into retaining ring 3. It is thus inserted as a "snap-ring" into the circumferential groove 3a in the retaining ring, which is free of any holes, axial slots, or other "stress-raisers" by radially offsetting one end at opening 11. The retaining ring 3 is provided with a small supplementary annular groove 3c at a corner of groove 3a, and the key 9 is chamfered as at 9a, in order to provide corner clearances in accordance with good machining practice.

Locking key 9 is provided with two types of lugs extending radially inward from the annular part of the key. Lugs 12 have the same axial width as key 9 and are circumferentially spaced around the major portion of key 9. Lugs of another form, shown at 13, are also provided which not only extend radially inward but also have an axial dimension substantially greater than the axial width of key 9.

Referring to Fig. 2, the body portion of the rotor, shown generally as 1a, contains pole portions as at 1e, and winding portions as at 1f. Pole portion 1e contains alternate pole teeth 14 and pole slots 15. The winding portion 1f also contains alternate teeth 16 and slots 17. It will be understood that pole portion 1e covers a considerably smaller distance on the total rotor circumference than does the winding portion 1f. It will also be understood that on a two-pole generator rotor, there would be a similar pole portion disposed 180° from pole portion 1e; and on a four-pole rotor, also at 90° each way from pole portion 1e.

Both the pole teeth 14 and the winding teeth 16 are machined to a reduced diameter of close tolerance at the end of the rotor body to provide shrink fit surfaces 1c. The corresponding circumferential surface 3b on the retaining ring 3 is provided with a diameter slightly less than that formed by surfaces 1c so that, when the retaining ring is heated, it will expand to allow surface 3b to slip over surface 1c and upon cooling the retaining ring will tightly grip the rotor body 1a.

Winding teeth 16 and pole teeth 14 are also provided with arcuate recesses 1d, 1g respectively forming a circumferential groove at the end of rotor body 1a. These recesses 1d, 1g are of sufficient length and depth to accommodate lugs 12, 13 and to allow some slight freedom of movement of the lugs in the recesses in order that the key 9 can easily be rotated to a locked position. The "outboard" ends of recesses 1d, 1g define radial abutment surfaces 1h, 1j respectively. It will be apparent that there is a recess 1g corresponding to each lug 13 on key 9, and that there is a recess 1d corresponding to each lug 12 on the locking key 9. Also, the circumferential dimension of lugs 12, 13 is such that the lugs are free to slide axially along winding slots 17 and pole slots 15 respectively.

The winding slots 17 are provided with slot wedges 18 in keeping with the usual practice, the wedges being used to prevent the windings from coming out of the slot due to centrifugal force. In order to hold the amortisseur windings in place in the pole slots 15, amortisseur wedges 19 are also provided. It will be seen that the slot wedges 18, 19 are reduced in radial thickness at their ends 18a, 19a to allow axial passage of the lugs 12, 13 in slots 15, 17.

In order to prevent circumferential displacement of the locking key 9 with respect to the rotor body 1b, a locking screw 21 is provided which is threaded into a pole tooth 14, and engages a cutout 13a in the end of one of the lugs 13 and a similar cutout 14a in the corresponding pole tooth. A similar locking screw is provided at the diametrically opposite pole on the rotor to insure that the locking key is firmly secured against circumferential displacement. The locking screw 21 is not, however, secured in place until after assembly of the locking structure has taken place, as will be later described. It will also be observed that lugs 13 are of sufficient axial length to project beyond the axially extending portion 3d of retaining ring 3 at the end of the retaining ring. Thus, after assembly has taken place, lugs 13 will project beyond the edge of the retaining ring 3 in order to afford means to displace key 9 circumferentially with respect to rotor body 1a.

In operation the assembly of the retaining ring 3 to rotor body 1b is as follows. Locking key 9 is inserted into retaining ring groove 3a by making use of the cut 11 to offset the cut ends and contract the key 9 so that it can enter the groove. The retaining ring is heated uniformly to a sufficient temperature to expand the ring and is then slid into overlapping relationship with rotor body 1a so that shrink fit surface 3b is disposed opposite shrink fit surfaces 1c on the rotor body. As the retaining ring is slid axially over the rotor body, the lugs 13 are aligned to pass axially along pole slots 15 and lugs 12 to pass axially along winding slots 17. The retaining ring 3 is adjusted axially until lugs 13 are aligned with the ends of recesses 1g in the pole teeth 14. When this alignment has been secured on diametrically opposite sides of the rotor, it is also insured that the now obscured lugs 12 are in alignment with recesses 1d in the winding teeth 16. The locking key 9 is then rotated circumferentially with respect to rotor body 1b, by moving locking key 9 alone, or alternatively by rotating retaining ring 3 and the key 9 together. This will move the lugs 13 into recesses 1g and will move lugs 12 into recesses 1d. The proper amount of rotation will automatically be determined since the last lugs 13 in direction of rotation will strike the abutment 1k on the pole tooth to prevent overtravel. At this point, cutout portions 13a and 14a for locking screw 21 also should be aligned with one another, and the locking screw 21 can be assembled. The lugs 12, 13 will then limit axial displacement of the retaining ring by virtue of their being obstructed by the abutment surfaces 1h, 1j at the outboard end of the cutouts 1d, 1g. The retaining ring is then slightly withdrawn axially until locking key 9 contacts these abutment surfaces, and it is allowed to cool until surface 3b grips surfaces 1c to complete the shrink fit.

In actual practice, an additional shrink fit is being performed at the same time that the foregoing takes place, in securing the outboard end of retaining ring 3 to centering ring 4 as seen in Fig. 1. By exerting a withdrawing force on centering ring 4 as the assembly cools, centering ring 4 will come in contact with radial flange 3e on the retaining ring and will exert an axial force on retaining ring 3 as it is held by the key 9 in groove 3a.

Thus a very simple locking construction is afforded by the foregoing elements which obviates the necessity of any stress-raising discontinuities in the surfaces of the retaining ring by virtue of employing smooth annular grooves. Therefore, the improved structure increases the reliability of the rotor, by eliminating stress concentrations and thus reducing the possibility of retaining ring rupture due to the high hoop stresses inherently imposed on the retaining ring.

It will be obvious to those skilled in the art that numerous changes and substitutions of mechanical equivalents might be made in the construction and assembly of the components of my improved structure.

For example, it can be seen by reference to Fig. 2 that it is not necessary that lugs 12, 13 be of different size but could all be constructed as are lugs 13. This of course would involve the enlargement of cutout portions 1d to accommodate the increased axial length of the lugs and would, for this reason, be a less desirable construction.

Another possibility would be to construct the key so that all lugs are similar to lugs 12. Since the entire key would be obscured from view during assembly, it would be necessary to form the annular groove 3a in the retaining ring so as to obtain a tight fit with the key to prevent it from turning in the retaining ring. During assembly, the retaining ring and key would naturally be rotated into locked position as a unit.

An additional modification would be to manufacture the locking key in several arcuate segments rather than in a single circular member as shown in the preferred embodiment.

It is, of course, desired to cover by the appended claims all such modifications as fall within the true spirit and scope of the invention.

What I claim as new and desire to secure my Letters Patent of the United States is:

1. A retaining ring locking assembly for the rotor of a dynamoelectric machine comprising a rotor body portion having axially disposed, conductor-carrying slots and defining connected circumferential and axial groove portions at the periphery on at least one end thereof, a retaining ring to hold the conductor end turns in place and having an extending end portion overlapping said rotor body grooved portion, said overlapping portion having a smooth internal annular groove therein, key means disposed in said retaining ring groove and defining circumferentially spaced radially extending lugs adapted to slide axially through said rotor axial groove portions and circumferentially through said rotor circumferential groove portions, whereby rotation of the key means relative to said rotor body portion will lock said retaining ring in position to limit the axial displacement of the retaining ring with respect to the rotor body, and means to prevent the rotation of said key means from said locked position.

2. A retaining ring locking assembly for the rotor of a dynamoelectric machine comprising a rotor having at one end thereof discontinuous radial flange surfaces facing the rotor center portion, a retaining ring having a portion overlapping said rotor body and including a radially extending continuous flange surface axially spaced from and facing said rotor discontinuous radial surfaces, key means disposed between the retaining ring and the rotor and having an arcuate portion adjacent said continuous retaining ring radial surface and having a plurality of radially inwardly extending lugs adjacent the discontinuous rotor radial surfaces, said lugs being small enough to pass axially through the spaces defined between the rotor discontinuous surfaces, said key means being rotatable to axially align the lugs and the radial rotor surfaces, and means to prevent the circumferential movement of the key means with respect to the rotor.

3. A retaining ring locking assembly for the rotor of a dynamoelectric machine comprising an axially-slotted rotor body portion, having an annular groove intersecting said slotted portion, a retaining ring for securing the rotor end turns and having a portion coaxially overlapping said rotor annular groove, and including retaining ring annular groove disposed opposite the rotor annular groove, key means including an arcuate portion disposed in said retaining ring annular groove and having a plurality of circumferentially spaced radially extending lugs disposed in the rotor annular groove, whereby axial movement of said lugs can take place in the rotor slots and circumferential movement of the lugs can take place in the rotor groove, and means securing the key means against rotation with respect to the rotor from the "locked" position with the lugs circumferentially displaced from the rotor slots.

4. A locking arrangement for preventing relative axial displacement of associated first and second coaxial rotating members comprising a first inner cylindrical member having a plurality of circumferentially spaced radially outwardly extending projections and shrink fit surface portions at one end thereof, a second "annular" member having a first inner circumferential surface adapted to overlap said first member projections and extending axially beyond said projections, said extending portion of the second member being provided with an internal annular groove, said annular member having shrink-fit portions registering with said first member shrink fit surfaces, locking key means including at least one arcuate member disposed in said annular groove and including a plurality of radially inwardly projecting lugs disposed to slide axially between said first member projections, whereby circumferential displacement of said key means on said first member effects alignment of said lugs with the projections to limit axial displacement of the first cylindrical member with respect to the second member, and means to secure the key means in said aligned position.

5. A retaining ring locking assembly for the rotor of a dynamoelectric machine comprising a rotor having a series of axially extending circumferentially spaced slots and having a first annular groove near one end intersecting said axial slots to form circumferentially spaced radially extending projections on the end of the rotor body, a retaining ring having an axial portion overlapping the rotor body end portion and substantially coaxial therewith, said retaining ring having a smooth second annular groove in said overlapping portion disposed opposite said first groove, and key means having a first arcuate portion fitting in said second groove and having a plurality of circumferentially spaced radially inwardly extending lugs disposed on said first arcuate portion, said lugs being of a lesser circumferential width than said axial rotor slots and being of a lesser axial length and radial thickness than the first groove, whereby angular displacement of the key means with respect to the rotor will cause the lugs to become aligned with the rotor projections to prevent axial disengagement of the retaining ring with respect to the rotor.

6. A retaining ring locking construction for the rotor of a dynamoelectric machine comprising a rotor body having axial slots, at least one annular retaining ring coaxially overlapping an end of the rotor body with a shrink fit, arcuate key means located in a first smooth annular groove formed on the internal surface of the retaining ring and a second annular groove formed on the external surface of the end portion of the rotor body, said key means containing alternate cutouts and lugs on its radially inner portion, said inner portion being disposed in the second annular groove, said cutouts and lugs being arranged so that the retaining ring with key means in place in the first annular groove can be assembled on the end of the rotor body by virtue of the inward projecting lugs passing axially through the rotor slots until they register circumferentially with the second annular groove, and the key means then being moved circumferentially just far enough for the lugs to become aligned with the rotor tooth portions of the annular groove, thus forming a structure similar to a "bayonet" or "breech block" type of lock, with no holes, axial grooves, or other "stress-raisers" for hoop stresses in the retaining ring.

References Cited in the file of this patent

UNITED STATES PATENTS

| 1,700,070 | Musgrove et al. | Jan. 22, 1929 |
| 1,712,049 | Robb | May 7, 1929 |
| 1,890,340 | Rose | Dec. 6, 1932 |
| 2,621,223 | Vickers et al. | Dec. 9, 1952 |
| 2,773,210 | Vogt | Dec. 4, 1956 |

FOREIGN PATENTS

| 378,920 | Great Britain | Aug. 19, 1932 |